Figure 1:
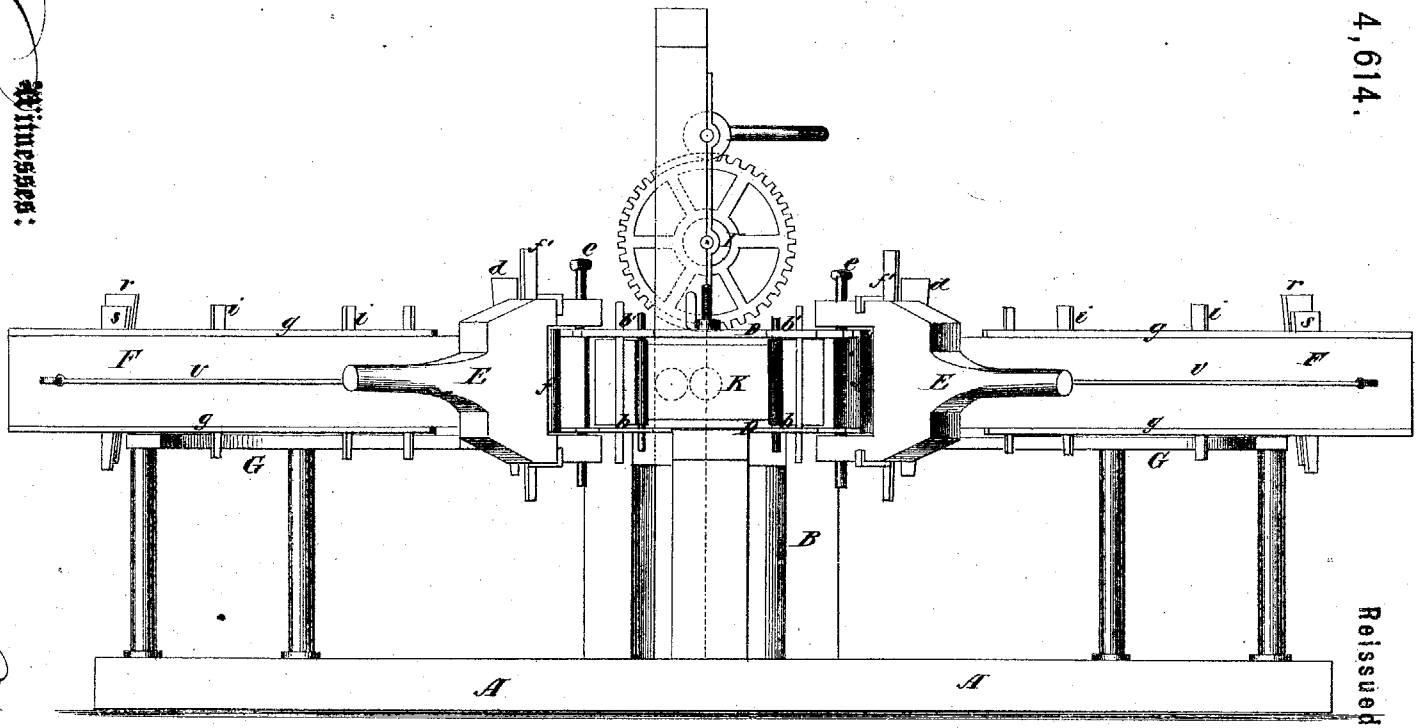

Sheet I

2 Sheet.

H. McDONALD.

Improvement in Wood Bending Machines.

No. 4,614.

Reissued Oct. 31, 1871.

Witnesses:

Gustave Dieterich

Francis McArdle

Inventor:

H. McDonald

Per Munn & Co

Attorneys.

AM. PHOTO-LITHOGRAPHIC CO. N.Y. (OSBORNE'S PROCESS.)

Sheet. 2. 2. Shts
H. McDONALD.
Improvement in Wood Bending Machines.
No. 4,614. Reissued Oct. 31, 1871.
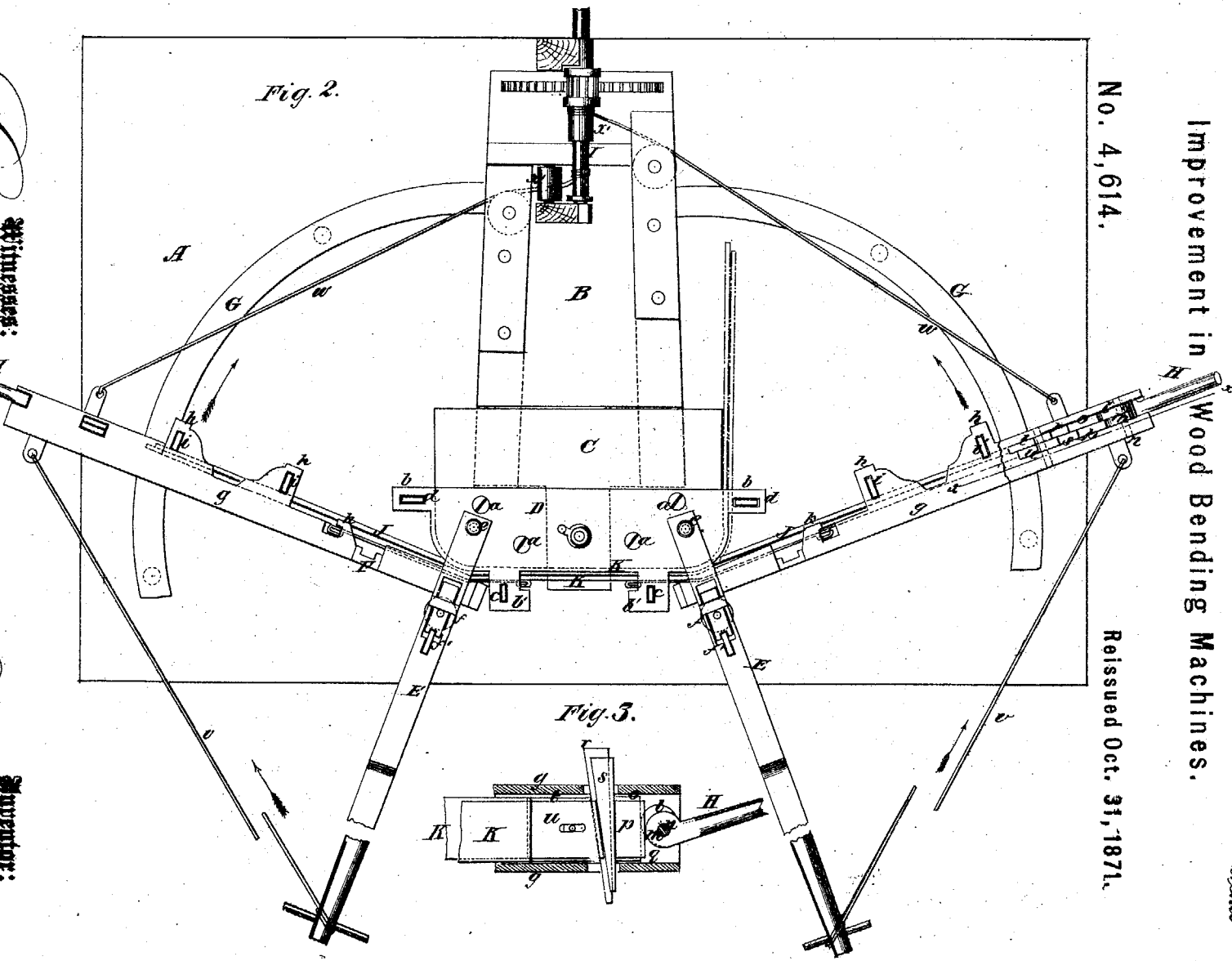
Witnesses:
Gustave Dieterich
Francis McArdle
Inventor:
H. McDonald.
per Munn & Co.
Attorneys.
AM. PHOTO-LITHOGRAPHIC CO. N.Y. (OSBORNE'S PROCESS.)

UNITED STATES PATENT OFFICE.

HIRAM McDONALD, OF SHORTSVILLE, NEW YORK.

IMPROVEMENT IN WOOD-BENDING MACHINES.

Specification forming part of Letters Patent No. 31,182, dated January 22, 1861; reissue No. 4,548, dated September 12, 1871; reissue No. 4,614, dated October 31, 1871.

*To all whom it may concern:*

Be it known that I, HIRAM McDONALD, of Shortsville, in the county of Ontario and State of New York, have invented certain Improvements in Wood-Bending Machines, of which the following is a specification:

My invention consists in the improvement of devices for bending steamed wood into wagon-bows and fellies, as hereinafter fully described and subsequently pointed out in the claims.

In the drawing, Figure 1 is an elevation, Fig. 2 a plan, and Fig. 3 a section through line *x x* of Fig. 2.

A is the bed-piece of a bending-former for making wagon-bows; B, a block attached thereto; and C, the double former. D D are plates on two sides of this former, provided with slotted and hooked ears *b b'*. F F are lever-beds, to which the wooden strips are made fast at those parts not to be bent, and which are also provided with metal straps J, having transverse eyes at each end. G G are guides on which one end of these levers rests, and on which it travels when bending the strips. These levers F also have plates *g* on two of their sides, which are provided with projections *h* for keys *i*, and with hooks K. These levers are held to their position firmly by a clamp, consisting of bifurcated pieces E, and adjustable bearing rollers *f*, fastened on a slide working therein. These clamps E embrace and are pivoted to the mold. This is an important part of my invention, because the bending-levers F, being allowed play at their working ends, move on a continually-changing fulcrum, and these clamps, therefore, not only move in a curve with the levers, but also have a rectilinear motion on the back thereof. By this combined movement the clamp always holds the lever tightly over the point being bent. The levers F are also provided, in the outer parts thereof, with two eccentrics, *l m*, of a slightly different form, but on a common axis, *n*, and having a common lever, H. *o p t u* are sliding plates, against which the eccentrics bear, while *r s* are keys interposed between them. *w* are chains or cords, which connect the outer ends of the lever-beds F and clamps E *f*. W *x* I form an ordinary windlass mechanism for turning the lever-beds, which bend the blank against the former.

The mode of operation is as follows: The steamed strips of wood are fastened on beds F F by keys *i*. The ends of the strips are brought against slides *t u*, and there held by keys *r s*. The straps J are then attached at one end to plates D of the former, and at the other to the bed-levers F F. The straps J are then keyed, and the strips of wood secured in the exact position desired. The windlass, being set in motion, carries the lever-beds F F around and on the curved plates G, and in turn they carry their clamps E *f* on the arc of a perfect circle. As the radius of the lever-beds continues to shorten the clamps E move up on the backs of the bending-levers F F. While the strips K are being bent their ends are upset against the eccentrics *l m*.

The difference in the form of the eccentrics corresponds to the difference in the length of the outer and inner strips.

Having thus described all that is necessary to a full understanding of my invention, what I esteem to be new, and desire to secure by Letters Patent, is—

1. The eccentrics *l m*, sliding-plates *o p*, slides *t u*, and keys *r s*, arranged at the outer parts of the lever-beds, as described, to form an improved mode of upsetting the ends of the strips when under the bending operation.

2. A rigid and non-elastic bed-lever, F, holding the blank straight at every point not intended to be bent, connected by strap J with the former C, and provided with free ends that shift the fulcrum of the lever at every point of its movement, as shown and described, and for the purpose specified.

3. A pivoted clamp, E, with friction-roll *f* between the forks thereof, combined, as described, with a rigid bed-lever, F, as and for the purpose specified.

4. The former-plates D having hooked and slotted ears *b b'*, and the lever-plates *g g* having hooks *k* on lower end, combined with straps J having a transverse eye for a removable key at each end thereof, for the purpose of fastening said straps in the manner as shown and described.

HIRAM McDONALD.

Witnesses:
CHARLES LEE COOK,
ABIAL ALLEN.

(176)